US007424863B2

(12) United States Patent
Tsai

(10) Patent No.: US 7,424,863 B2

(45) Date of Patent: Sep. 16, 2008

(54) BELL AND BRAKE LEVER COMBINATION FOR BICYCLE

(75) Inventor: Szu-Fang Tsai, Puyan Township, Changhua County (TW)

(73) Assignee: Tektro Technology Corporation, Changhua (TW)

( * ) Notice: Subject to any disclaimer, the term of this patent is extended or adjusted under 35 U.S.C. 154(b) by 0 days.

(21) Appl. No.: 11/655,284

(22) Filed: Jan. 19, 2007

(65) Prior Publication Data

US 2008/0173231 A1 Jul. 24, 2008

(51) Int. Cl.
*B62J 3/00* (2006.01)

(52) U.S. Cl. .................... 116/148; 116/166; 188/24.11; 74/502.2

(58) Field of Classification Search ................. 116/148, 116/152, 155, 164, 166, 167, 169, 171, 172, 116/60, 61; 74/502.2, 489; 84/406; D10/116; D17/22; 188/24.11, 24.22, 72.9, 206 R
See application file for complete search history.

(56) References Cited

U.S. PATENT DOCUMENTS 550,507 A * 11/1895 Hopkins ..................... 116/164
559,950 A * 5/1896 Rhind ......................... 116/164
679,659 A * 7/1901 Wolhaupter .................. 116/61
1,213,058 A * 1/1917 Alukonis ..................... 116/157
D360,159 S * 7/1995 Moore ........................ D10/116
7,182,039 B2 * 2/2007 Ichimura et al. ............ 116/167

FOREIGN PATENT DOCUMENTS

DE 2727951 A * 1/1979
JP 08258766 A * 10/1996

* cited by examiner

*Primary Examiner*—R. A. Smith
*Assistant Examiner*—Amy Cohen Johnson

(57) ABSTRACT

A bell mounted in one of at least one brake lever of a bicycle is disclosed. The brake lever includes two brake levers each including an opening section. In one embodiment, the bell includes a sounding section in the opening section and including a hollow cylinder, an annular flange having one open end in communication with inside of the cylinder, a first spring biased between an inner wall of the brake lever and the cylinder with the flange disposed therein, a second spring in the cylinder and having one end engaged with the end of the cylinder, and a bolt driven through the second spring, the flange, and the first spring to have one end threadedly secured in the brake lever and a head urging against the second spring; and a spring biased striking section pivotably secured onto the brake lever and including a lever and a clapper.

2 Claims, 4 Drawing Sheets

BELL AND BRAKE LEVER COMBINATION FOR BICYCLE

BACKGROUND OF THE INVENTION

1. Field of Invention

The invention relates to bicycle bell and more particularly to an improved bell mounted in a brake lever of bicycle.

2. Description of Related Art

A conventional bell 1 for bicycle is shown in FIG. 5 and comprises a cuplike member 11 formed of metal, a C-shaped ring 12 mounted under the cuplike member 11 and clamped on a handlebar (not shown), and a spring biased lever 13 extending out of a front edge of the cuplike member 11. In operation, a rider may press the lever 13 to strike a clapper (not shown) inside the cuplike member 11 to ring as warning while riding. However, the well known bell 1 suffered from a disadvantage. For example, it is typical for a bicycle rider to press the lever 13 with the thumb and press a brake lever (not shown) with the remaining fingers of the same hand in case of braking. This can cause difficulties in the braking operation even the bell lever 13 is disposed in the vicinity of the brake lever, particularly for women and children having small hands.

Another conventional bell is shown in FIG. 6. The bell is mounted on a top surface of the house of a brake lever and the bell is also disposed in the vicinity of the brake lever. That is, it is intended to facilitate the manipulation of pressing the bell lever and the brake lever by the same hand substantially at the same time while riding. But this is unsatisfactory for the purpose for which the invention is concerned for the following reason: The bell is simply mounted in the brake lever with no improvements.

Thus, continuing improvements in the exploitation of bell and brake lever combination for a bicycle are constantly being sought.

SUMMARY OF THE INVENTION

It is therefore one object of the invention to provide a bell mounted in one of at least one brake lever of a bicycle, each brake lever including an opening section open to a rear portion and one side, comprising a sounding section in the opening section and including a hollow cylinder, an annular flange having one open end in communication with inside of the cylinder, a first spring biased between an inner wall of the brake lever and the cylinder with the flange disposed therein, a second spring in the cylinder and having one end engaged with the end of the cylinder, and a bolt driven through the second spring, the flange, and the first spring to have one end threadedly secured in the brake lever and a head urging against the second spring; and a spring biased striking section pivotably secured onto the brake lever and including a lever and a clapper, whereby pressing the lever of the striking section with the thumb will cause the clapper to strike the cylinder to ring.

It is another object of the invention to provide a bell for a bicycle including two brake levers each including an opening section open to a rear portion and one side, comprising a sounding section in the opening section and including a hollow cylinder, an annular flange having one open end in communication with inside of the cylinder, a first spring biased between an inner wall of the brake lever and the cylinder with the flange disposed therein, a second spring in the cylinder and having one end engaged with the end of the cylinder, a bolt driven through the brake lever, the first spring, the flange, and the second spring, and a nut threadedly secured to the bolt for urging against the second spring; and a spring biased striking section pivotably secured onto the brake lever and including a lever and a clapper, whereby pressing the lever of the striking section with the thumb will cause the clapper to strike the cylinder to ring.

The above and other objects, features and advantages of the invention will become apparent from the following detailed description taken with the accompanying drawings.

DETAILED DESCRIPTION OF THE INVENTION

Figure 1:
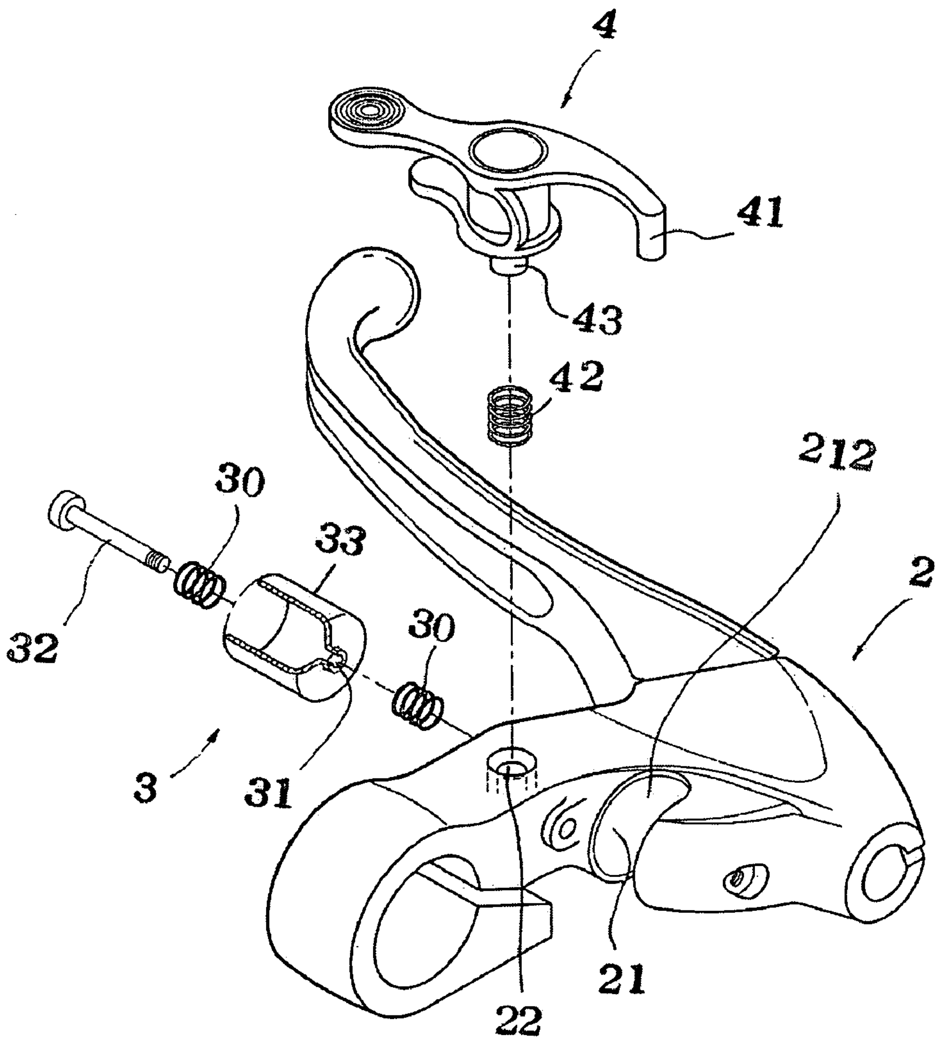
FIG. 1 is an exploded perspective view of a first preferred embodiment of bell and brake lever combination for bicycle according to the invention.
Figure 3:
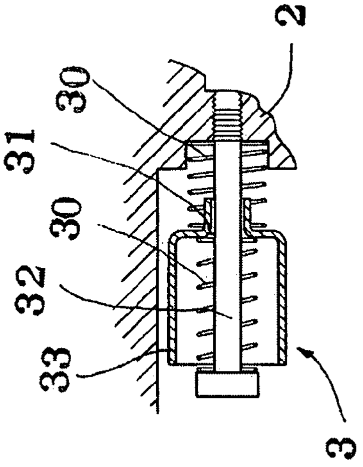
FIG. 3 is a sectional view taken along line 3-3 of FIG. 2.
Figure 2:
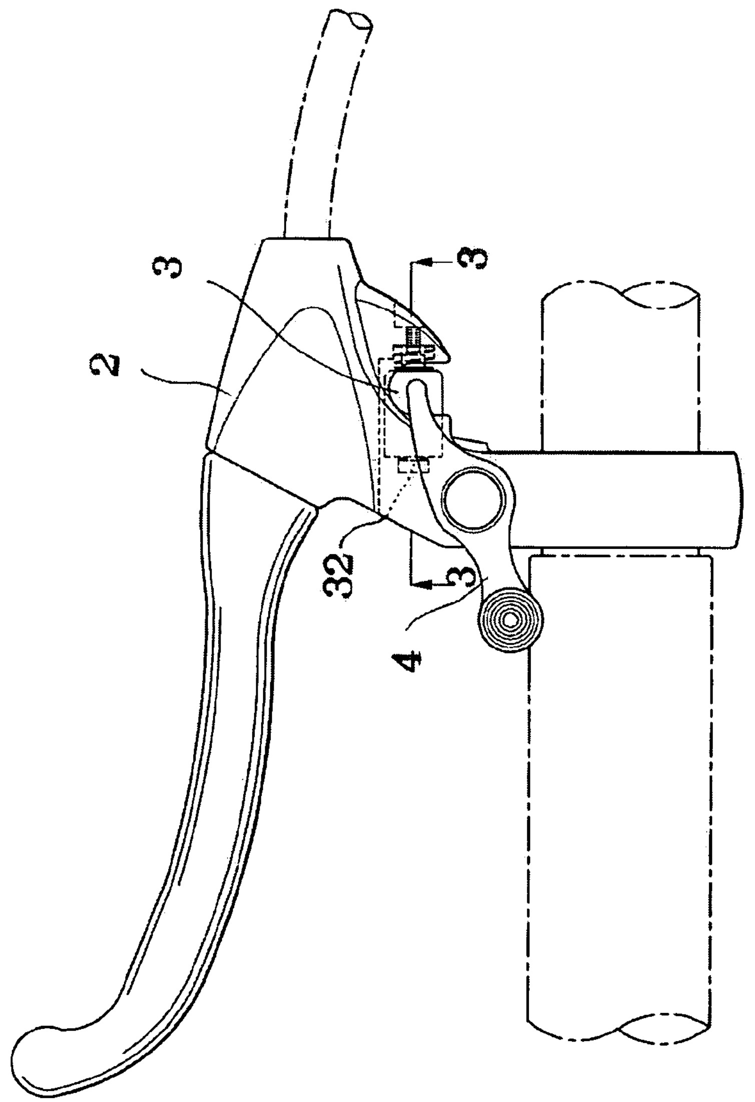
FIG. 2 is a top view of the brake lever and the bell assembled on a handlebar.

Referring to FIGS. 1 to 3, a bell in accordance with a first preferred embodiment of the invention mounted in a house 2 of a brake lever of bicycle is shown. A recess 21 is formed in a rear portion of the house 2. A transverse opening section 212 is formed inside the recess 21 and open to a left side of the house 2. A vertical hole (not numbered) is formed on the house 2 and a pivot 22 is formed in the hole.

The bell comprises a striking section 4 and a sounding section 3. The metal sounding section 3 is mounted in both the recess 21 and the opening section 212. In detail, the sounding section 3 comprises a hollow cylinder 33, an extending annular flange 31 having one open end in communication with the end of the cylinder 33 and the other open end facing a cavity (not numbered) on an inner wall of the house 2, a first spring 30 biased between the cavity and the end of the cylinder 33 with the flange 31 disposed therein, a second spring 30 mounted in the cylinder 33 and having one end engaged with the end of the cylinder 33, and a bolt 32 driven through the second spring 30, the flange 31, and the first spring 30 to have its threaded front portion fastened in a threaded through hole (not numbered) of the house 2 wherein the second spring 30 in the cylinder 33 has one end biased against the end of the cylinder 33 and the other end biased against the head of the bolt 32.

The striking section 4 comprises a bottom hollow peg 43, a third spring 42 elastically put on the peg 43 which is in turn securely, pivotably put on the pivot 22, and an extending bent clapper 41 disposed proximate the cylinder 33.

In operation, a rider may press the lever of the striking section 4 with the thumb to cause the clapper 41 to strike the cylinder 33 to ring as warning while riding. At the same time, the four remaining fingers of the same hand can press the brake lever against the grip of the handlebar to brake the bicycle without any difficulties.

Figure 4:
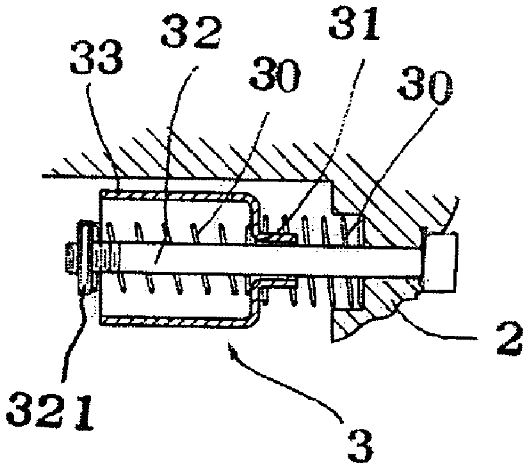
FIG. 4 is a view similar to FIG. 3 showing a second preferred embodiment of bell according to the invention.
Figure 5:
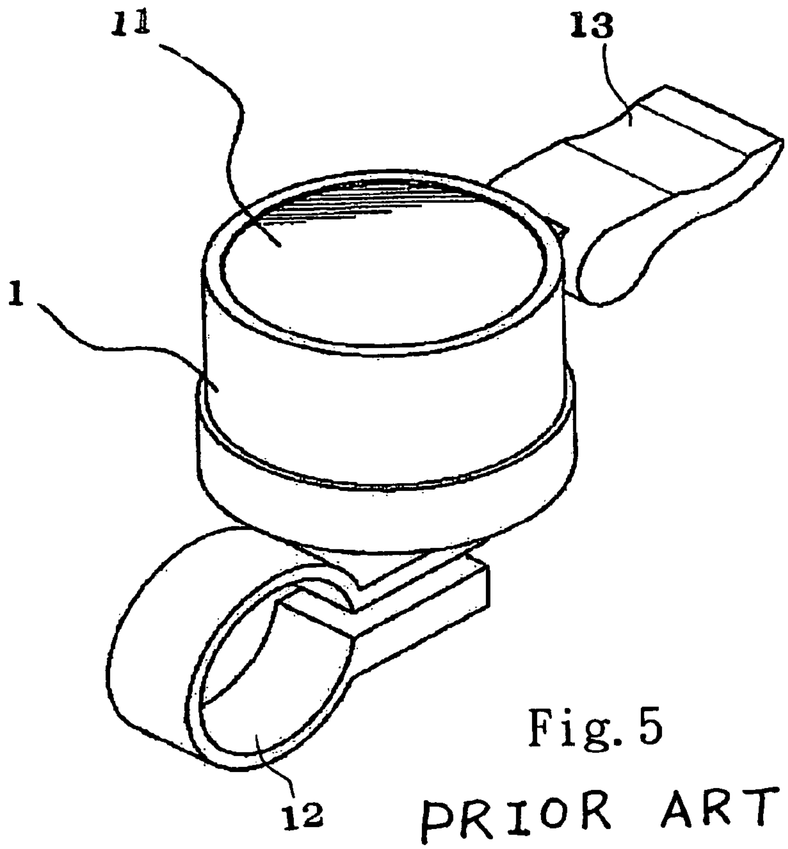
Fig. 5 PRIOR ART
FIG. 5 is a perspective view of a conventional bicycle bell.
Figure 6:
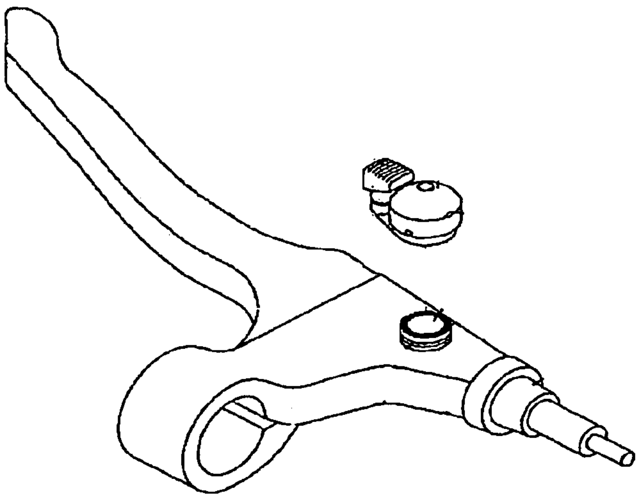
Fig. 6 PRIOR ART
FIG. 6 is a perspective view of a conventional bicycle brake lever with a bell to be mounted thereon.

Referring to FIG. 4, a second preferred embodiment of the sounding section 3 according to the invention is shown. The characteristics of the second preferred embodiment are detailed below. The bolt 32 is mounted in a direction opposite to that shown in the first embodiment. Further, a nut 321 is provided to threadedly secure onto the threaded front portion of the bolt 32 for urging against the second spring 30 in the cylinder 33.

While the invention herein disclosed has been described by means of specific embodiments, numerous modifications and variations could be made thereto by those skilled in the art without departing from the scope and spirit of the invention set forth in the claims.

What is claimed is:

1. A bell mounted in one of at least one brake lever of a bicycle, the at least one brake lever including an opening section open to a rear portion and one side, comprising:

a sounding section in the opening section and including a hollow cylinder, an annular flange having one open end in communication with an inside of the cylinder, a first spring biased between an inner wall of the brake lever and the cylinder with the flange disposed therein, a second spring in the cylinder and having one end engaged with the end of the cylinder, and a bolt driven through the second spring, the flange, and the first spring to have one end threadedly secured in the brake lever and a head urging against the second spring; and a spring biased striking section pivotably secured onto the brake lever and including a lever and a clapper, whereby pressing the lever of the striking section will cause the clapper to strike the cylinder to ring.

2. A bell mounted in one of at least one brake lever of a bicycle, the at least one brake lever including an opening section open to a rear portion and one side, comprising:

a sounding section in the opening section and including a hollow cylinder, an annular flange having one open end in communication with an inside of the cylinder, a first spring biased between an inner wall of the brake lever and the cylinder with the flange disposed therein, a second spring in the cylinder and having one end engaged with the end of the cylinder, a bolt driven through the brake lever, the first spring, the flange, and the second spring, and a nut threadedly secured to the bolt for urging against the second spring; and a spring biased striking section pivotably secured onto the brake lever and including a lever and a clapper, whereby pressing the lever of the striking section will cause the clapper to strike the cylinder to ring.

* * * * *